June 14, 1932.　　　M. S. ANDERSON　　　1,862,917
FISHING SPOON
Filed May 29, 1929
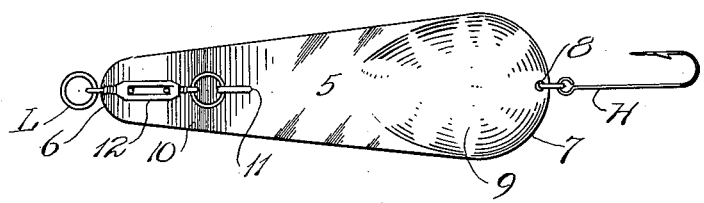
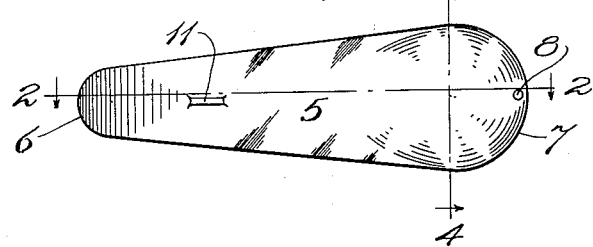
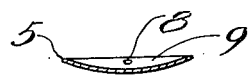
INVENTOR.
Martin Anderson,
BY Sterling P Buck,
ATTORNEY.

Patented June 14, 1932

1,862,917

UNITED STATES PATENT OFFICE

MARTIN S. ANDERSON, OF SEATTLE, WASHINGTON

FISHING SPOON

Application filed May 29, 1929. Serial No. 366,945.

This invention relates to fishing tackle, and especially to an improved and simplified form of fishing spoon.

One object of this invention is to provide a fishing spoon or artificial bait which is particularly designed for trolling, and which simulates the movements of a crippled minnow when drawn through the water.

Another object is to provide an artificial bait of this character which includes a single blank of sheet material pressed or molded into the curved and concavo-convexed form shown, and the manufacturing cost of which is reduced to the minimum.

Other objects and important features are pointed out or implied in the following details of description, in connection with the accompanying drawing in which:

Figure 1 is a side view, and for the purpose of detail description, it may be known as the plan or top side view.

Fig. 2 is a longitudinal sectional view, the section being taken along the line 2—2 of Fig. 3.

Fig. 3 is a bottom side view of the spoon detached from the hook and the line connection shown in Fig. 1.

Fig. 4 is a cross sectional view, the section being taken substantially in the line 4—4 of Fig. 3.

Referring to this drawing in detail, in which similar reference characters correspond to similar parts in the several views, and in which the hook H and line connection L may be of any appropriate kind, not being elements of this invention, the invention is now described in detail as follows:

The fishing spoon is generally indicated by the numeral 5, and consists of a sheet metal blank pressed into the shape shown, or a blank of any appropriate substantially rigid sheet material which may be either pressed or molded into the shape shown. The blank or body 5 has evenly curved front and rear ends 6 and 7 respectively, and its lateral edges taper gradually from the rear end 7 to the front end 6. The rear end is apertured at 8 for connecting the hook H. The body 5 is curved in opposite directions, as shown in Fig. 2, or defines an even compound curve along its median line. The rear end 7 is concaved at 9, or curved laterally as well as longitudinally, so its comparatively wide rear end is in the form of a spoon-bowl, while the part between the spoon-bowl 9 and the narrow front end is upwardly bowed as indicated at 10. In the middle of this upwardly bowed part 10, line attaching loop 11 is secured by any appropriate means and extends upward from this bowed or bulged part 10. The line connection L preferably includes a swivel 12 which is linked to the loop 11, so that in darting and twisting or turning, the fishing line will not be twisted thereby. The upwardly extended loop 11, and the downward bend of the front end 6 permit free action of the swivel 12.

The central part and front end, and all except the spoon part 9, are straight in cross section.

In trolling with this device, its curved front end serves to deflect it from a straight course, and when it has been deflected very considerably, the reaction of the line tending to return it to the straight course, in combination with the concaved part 9, causes it to turn and dart in a different direction, to cross the straight path in which the line tends to move it, and its curved front end continues to deflect it until the reaction or counter action of the line causes it to again turn toward and to cross the said path. Because of these deflections and dartings, it will be seen that this artificial bait very effectively simulates the movements of a minnow or small fish which is crippled, but alive.

Although I have described this embodiment of my invention specifically, I have no intention of limiting my patent protection to these exact details of description, for changes may be made within the scope of inventive ideas as implied and claimed.

What I claim as my invention is:

In a fishing spoon, a substantially rigid sheet having a rear end provided with a hook-attaching means, and having a narrow front end from which the lateral edges diverge gradually and evenly to the rear end, said plate defining an even compound curve along its median line, said rear end being semicircular and also curved from one end portion to the other in cross section and simulating the bowl of a table-spoon or ladle, the said narrow end and the longitudinal central part of the plate being straight in cross section, and a line-attaching loop extending out from the bulge of the curved median line and on the same side of the plate that includes the concave of the wide rear end, substantially as shown.

In testimony whereof I affix my signature.

MARTIN S. ANDERSON.